United States Patent [19]

Heins et al.

[11] Patent Number: 4,474,837

[45] Date of Patent: Oct. 2, 1984

[54] PROCESS FOR THE TREATMENT OF FIBRE MATERIALS

[75] Inventors: Ferdinand Heins, Erkrath; Martin Matner, Odenthal; Hermann-Josef Bross, Leverkusen, all of Fed. Rep. of Germany

[73] Assignee: Bayer Aktiengesellschaft, Leverkusen, Fed. Rep. of Germany

[21] Appl. No.: 423,097

[22] Filed: Sep. 24, 1982

Related U.S. Application Data

[63] Continuation of Ser. No. 261,011, May 6, 1981, abandoned.

[30] Foreign Application Priority Data

May 14, 1980 [DE] Fed. Rep. of Germany ....... 3018385

[51] Int. Cl.³ ............................................... B05D 3/02
[52] U.S. Cl. ............................... 427/393.4; 427/389.7; 427/389.9; 427/391; 427/392; 427/393.5; 427/393.6
[58] Field of Search ................. 427/393.4, 389.7, 392, 427/391, 389.9, 385.5, 393.5, 393.6

[56] References Cited

U.S. PATENT DOCUMENTS

| | | | |
|---|---|---|---|
| 2,847,404 | 8/1958 | Hoertz | 260/29.7 M |
| 2,941,971 | 6/1960 | Thompson et al. | 260/29.7 M |
| 3,594,206 | 7/1971 | Scarborough | 427/393.4 X |
| 3,650,801 | 3/1972 | Hinton, Jr. et al. | 427/393.4 X |
| 3,784,498 | 1/1974 | Ceska | 260/29.6 H |
| 3,821,172 | 6/1974 | Sugiura et al. | 427/393.4 X |
| 4,061,833 | 12/1977 | Pelletier et al. | 428/511 |
| 4,272,569 | 6/1981 | Shaw et al. | 427/336 |

*Primary Examiner*—Thurman K. Page
*Attorney, Agent, or Firm*—Connolly and Hutz

[57] ABSTRACT

Articles having improved resistance to water can be obtained from fibre materials by using carboxylated rubber latices having particle diameters of less than 200 nm which have been produced by one-step polymerization at pH-values below 7 in the presence of mononuclear alkylaryl sulfonates and oil-soluble initiators.

6 Claims, No Drawings

PROCESS FOR THE TREATMENT OF FIBRE MATERIALS

This application is a continuation of application Ser. No. 261,011 filed May 6, 1981, now abandoned.

This invention relates to an improved process for the treatment of fibre materials using synthetic carboxylated rubber latices having particle diameters of less than 200 nm which have been obtained by one-step polymerisation in the presence of mononuclear alkyl aryl sulfonates and organic peroxides.

It is known that waterproof fibre fleeces, for example, can be obtained by treatment with carboxylated rubber latices provided that, in the production of the latices, polymerisation is carried out either in the presence of only small quantities of emulsifiers or in the complete absence of emulsifiers (cf. for example U.S. Pat. Nos. 2,847,404, 2,941,971 and 3,784,498). However, the polymer dispersions obtained by these methods of low-emulsifier or emulsifier-free polymerisation are generally obtained using a relatively larger quantity of a peroxodisulfate and, particularly where polymerisation is carried out at low pH values (pH 3.5), contain correspondingly large quantities of inorganic sulfate which adversely affects the resistance of the polymer films to water. On the other hand, low-emulsifier and emulsifier-free rubber dispersions have such high surface tensions that some hydrophobic substrates can prove difficult to wet, as is the case, for example, with heavily greased leather fibres, with certain mineral fibres and hydrophobic synthetic fibres of polyesters or polypropylene. In many cases, these wetting difficulties are often reflected in the fact that, in the final articles produced therefrom certain weights per unit area are not achieved. In addition, low-emulsifier or emulsifier-free rubber latices cannot be thermosensitised with polyethers (cf. for example German Pat. Nos. 869,861 and 1,243,394; German Auslegeschrift No. 2,400,428 anbd German Offenlegungsschrifts Nos. 1,569,119 and 2,005,974).

It has now been found that articles having improved resistance to water can be obtained from fibre materials by using carboxylated rubber latices having particle diameters of less than 200 nm which have been produced by one-step polymerisation at pH-values below 7 in the presence of mononuclear alkyl aryl sulfonates and oil-soluble initiators.

After drying, these latices form waterproof films and, by virtue of their outstanding gel strength, they provide the treated fibre materials with very good abrasion resistance and tensile strength in both the dry and the wet states and with high dimensional stability.

The present invention provides an improved process for the treatment of fibre materials with a synthetic rubber latex which is characterised in that the rubber latex used has a mean particle diameter of less than 200 nm and is produced using a mononuclear alkyl aryl sulfonate as emulsifier and an oil-soluble organic peroxide as initiator by the one-step polymerisation at 5° C. to 60° C. of
(A) from 0.5 to 6 parts by weight and preferably from 1 to 3 parts by weight of one or more $\alpha,\beta$-monoethylenically unsaturated mono- or di-carboxylic acids; and
(B) from 94 to 99.5 parts by weight and preferably from 97 to 99 parts by weight of a mixture of:
(a) from 10 to 90 parts by weight of one or more acyclic conjugated dienes containing from 4 to 9 carbon atoms, and
(b) from 10 to 90 parts by weight of one or more aromatic monovinyl compounds having an aromatic nucleus of 6 to 10 carbon atoms and/or (meth)acrylonitrile, the quantity of (meth)acrylonitrile in the mixture amounting to at most 50 parts by weight.

Polymerisation is preferably carried out at a temperature in the range from 30° C. to 50° C. and at a pH-value in the range of from 1.5 to 7.0 and preferably at a pH-value in the range of from 3.0 to 5.0.

Suitable $\alpha,\beta$-monoethylenically unsaturated mono- and dicarboxylic acids are, for example, acrylic acid, methacrylic acid, itaconic acid, fumaric acid and maleic acid and also the monoesters of the above-mentioned dicarboxylic acids such as, for example, monoalkyl itaconate, fumarate and maleate, the above-mentioned acids being preferred to the semi-esters.

Suitable acyclic conjugated dienes containing from 4 to 9 carbon atoms are, for example, 1,3-butadiene, 2-methyl-1,3-butadiene (isoprene), 2,3-dimethyl-1,3-butadiene, piperylene, 2-neopentyl-1,3-butadiene and other substituted dienes, for example 2-chloro-1,3-butadiene (chloroprene), 2-cyano-1,3-butadiene and also substituted, straight-chain conjugated pentadienes and straight-chain or branched-chain hexadienes. Its ability to copolymerise particularly effectively with aromatic vinyl compounds and (meth)acrylonitrile makes 1,3-butadiene the preferred monomer.

Suitable aromatic monovinyl compounds are those in which the vinyl group, optionally alkyl-substituted in the $\alpha$-position, is directly attached to an aromatic nucleus consisting of 6 to 10 carbon atoms. Examples of such aromatic monovinyl compounds are styrene and substituted styrene, such as 4-methyl styrene, 3-methyl styrene, 2,4-dimethyl styrene, 2,4-diethyl styrene, 4-isopropyl styrene, 4-chlorostyrene, 2,4-dichlorostyrene, divinyl benzene, $\alpha$-methyl styrene and vinyl naphthalene. Styrene is the preferred monomer for reasons of availability and by virtue of its ability to copolymerise excellently, in particular with 1,3-butadiene.

Up to 10 parts by weight and preferably up to 5 parts by weight of the total monomer mixture may be replaced by one or more monomers which copolymerise with the above-mentioned monomers. Monomers such as these include in particular esters of acrylic and/or methacrylic acid with alcohols containing up to 8 carbon atoms and also diesters of alkane diols and $\alpha,\beta$-monoethylenically unsaturated monocarboxylic acids, such as ehtylene glycol diacrylate and 1,4-butane diol diacrylate, amides of $\alpha,\beta$-monoethylenically unsaturated mono- and dicarboxylic acids, such as acrylamide and methacrylamide and their N-methylol derivatives, also N-alkoxy methyl and N-acyl-(meth)-acrylamides containing from 1 to 4 carbon atoms in the alkoxy group, for example N-methylol (meth)acrylamide, N-methoxy methyl(meth)acrylamide, N-n-butoxy methyl(meth)acrylamide and N-acetoxy methyl(meth)acrylamide. Other suitable comonomers are vinyl esters of carboxylic acids containing from 1 to 18 carbon atoms, particularly vinyl acetate and vinyl proprionate, vinyl chloride and vinylidene chloride, vinyl ethers, such as vinyl methyl ether, vinyl ketones, such as vinyl ethyl ketone, and heterocyclic monovinyl compounds, such as vinyl pyridine.

Oil-soluble organic peroxides capable of producing free radicals are used as polymerisation initiators in quantities of from 0.01 to 2.0 parts by weight and preferably in quantities of from 0.02 to 1.0 part by weight. Examples of suitable polymerisation initiators are dibenzoyl peroxide, dilauryl peroxide, cumene hydroperoxide, p-menthane hydroperoxide, pinane hydroperoxide and tert.-butyl hydroperoxide. These initiators may optionally be activated by water-soluble reducing agents, for example, sodium formaldehyde sulfoxylate and/or heavy metal ions, such as iron-II- or iron-III-ions.

Mononuclear alkyl aryl sulfonates containing linear or branched-chain $C_4$–$C_{18}$-alkyl radicals are used as emulsifiers in quantities of from 0.5 to 5.0 parts by weight and preferably in quantities of from 2.0 to 5.0 parts by weight. Typical representatives are the alkali salts of decyl, dodecyl and hexadecyl benzene sulfonic acid. However, it is preferred to use the ammonium salts or ammonium salts substituted on the nitrogen of mononuclear alkyl aryl sulfonic acids. In addition, from 0.5 to 2.0 parts by weight of other anionic emulsifiers may optionally be additionally used. In the acid range, however, it is only possible to use emulsifiers of the type which are derived from acids having high $pK_B$-values, particularly sulfates and sulfonates. Examples of such emulsifiers are long-chain fatty alcohol sulfates and alkyl sulfonates, polynuclear, optionally alkyl-substituted aryl sulfonates and their condensation products with formaldehyde, long-chain hydroxy alkyl sulfonates, salts of sulfosuccinic acid ester and sulfated ethylene oxide adducts.

The emulsion polymerisation reaction may optionally be carried out in the presence of polymerisation aids, such as buffers, chelating agents and accelerators. Polymerisation may also be carried out in the presence of chain-transfer agents, for example, tetrabromomethane, tetrabromoethane, bromoethyl benzene, alcohols, long-chain alkyl mercaptans and dialkyl dixanthogenates. The type and quantity used depends inter alia upon the effectiveness of the compounds and upon the amount of diene used and are known to the expert.

To carry out the one-step polymersiation reaction, the total quantity of monomers and initiator is initially introduced. The remaining additions may also be partly or completely introduced at the beginning. Accordingly, it is also possible for example for chain-transfer agents and reducing agents and also emulsifiers of the type and quantity mentioned above to be added in portions during the polymerisation reaction.

The particle size of the rubber latex may be adjusted as required by methods known to the expert and described, for example, in Houben-Weyl, Methoden der Organischen Chemie, Vol. XIV/1, Georg Thieme Verlag, Stuttgart, 1961, pages 335 et seq. and pages 375 et seq. However, it is essential that the mean particle diameter should be less than 200 nm in order to obtain high wet strengths of the fibre materials treated in accordance with the invention.

The latex may have a solids content of from 1 to 65% by weight. Normally, however, the latex used will have a solids content of from 30 to 50% by weight. In addition, by adding heat-sensitising agents, such as polyethers for example, the latex may be thermosensitised.

Even in cases where large quantities of mononuclear alkyl aryl sulfonate are used as emulsifier, waterproof films are surprisingly obtained from the rubber latex. This does of course presuppose that the synthetic rubber has film-forming properties at room temperature, if necessary through the addition of plasticisers. Accordingly, the resistance of the films to water may be important in terms of practical application because, where the latex is used for binding fibre materials, high abrasion resistances and tensile strengths of the corresponding articles in both the wet and the dry state are frequently necessary. The process according to the invention is thus eminently suitable for the production of articles which have to satisfy these requirements and which, in addition, have to show high dimensional stability.

Fibre suspensions, fibre fleeces, needle felts, paper or card of synthetic or natural fibres, such as cellulose fibres, polyester, polyamide and polypropylene fibres, vegetable and/or chrome-tanned leather fibres and mineral fibres, such as glass, asbestos, rock and slag fibres, may be treated by the process according to the invention. The treatment with the carboxylated rubber latex may be carried out for example by impregnation, spraying, laminating or by precipitation.

The invention is illustrated by the following Examples in which the percentages quoted are all percentages by weight.

1. Production of the carboxylated synthetic rubber latex

EXAMPLE 1 (LATEX A)

In a 40-liter-capacity stainless-steel autoclave equipped with a cross-blade agitator, a mixture of 18000 g of water, 7000 g of 1,3-butadiene, 2600 g of styrene, 400 g of methacrylic acid and 50 g of tert.-dodecyl mercaptan is polymerised at 35° C. using 200 g of sodium dodecyl benzene sulfonate as emulsifier and 5 g of 80% tert.-butyl hydroperoxide and 2.5 g of sodium formaldehyde sulfoxylate dihydrate (Rongalit C) as the initiator system until a solids content of 20% is reached. A solution of 2.5 g of sodium formaldehyde sulfoxylate dihydrate (Rongalit C) in 500 g of water is then added and polymerisation is completed at 35° C. until the monomers have been almost completely converted. After the final concentration has been reached, polymerisation is stopped by the addition of a solution of 80 g of 25% diethyl hydroxylamine in 200 g of water and the latex obtained is freed from residual monomers in vacuo at 40° C. A latex having a solids content of around 35%, a pH value of 3.6 and a mean particle diameter of less than 80 nm (as measured by the light-scattering method) is obtained.

EXAMPLE 2 (Latex B)

The procedure is as described in Example 1, except that half the quantity of styrene is replaced by acrylonitrile. A latex having a solids content of about 34%, a pH value of 4.2 and a mean particle diameter of less than 80 nm (as measured by the light-scattering method) is obtained.

EXAMPLE 3 (Latex C)

The procedure is as described in Example 1, except that all the styrene is replaced by acrylonitrile. The synthetic rubber latex obtained has a solids content of approximately 35%, a pH-value of 5.7 and a mean particle diameter of less than 80 nm (as measured by the light-scattering method).

COMPARISON EXAMPLE 1 (Comparison Latex A)

The procedure is as described in Example 1, except that all the sodium dodecyl benzene sulfonate is replaced by a sodium sulfonate of a mixture of long-chain paraffin hydrocarbons having an average chain length of 15 carbon atoms. The comparison latex A obtained has a solids content of approximately 35% and a pH-value of 3.8. The mean particle diameter is less than 80 nm (as measured by the light-scattering method).

COMPARISON EXAMPLE 2 (Comparison Latex B)

The procedure is as described in Example 1, except that polymerisation is initiated by the addition of 20 g of ammonium peroxodisulfate and 10 g of sodium disulfite. After a solids content of 20% has been reached, a solution of 20 g of a ammonium peroxodisulfate in 250 g of water and a solution of 10 g of sodium disulfite in 250 g of water are added and polymerisation is completed in the same way as described in Example 1. After the final concentration has been reached, polymerisation is stopped and the latex is degassed in the same way as described in Example 1. The comparison latex B obtained has a solids concentration of 32% and a pH-value of 2.8. The mean particle diameter is 118 nm (as measured by the light-scattering method).

2. Testing of the polymer films for sensitivity to water

To test the sensitivity to water of the polymer films of latices A, B and C and comparison latices A and B, quantities of 5.0 ml of the synthetic rubber latex are fully and uniformly distributed over glass plates measuring $10 \times 10$ cm$^2$ and dried for 48 hours at room temperature to form coherent films. The glass plates coated with the polymer films are then stored in water at room temperature for 5 hours. The films are then examined for permeability to light and adhesion to the glass plate.

The following results are obtained:
Latex A Film slightly clouded (white), good adhesion to the glass plate.
Latex B Film less clouded than that of latex A, good adhesion to the glass plate.
Latex C Film completely clear and transparent, very good adhesion to the glass plate.
Comparison Latex A Film clouded (white) and opaque, can easily be removed from the glass plate.
Comparison Latex B Film clouded (white) and opaque, can be removed from the glass plate even more easily than that of comparison latex A.

Accordingly, synthetic rubber latices A, B and C give waterproof films characterised by good adhesion to the substrate, whilst the comparison latices give films which are sensitive to water and show poor adhesion.

3. Testing on various substrates 3.1 Impregnation of paper

A paper of the type used for making wet-grinding materials, i.e. a hyrophobic paper, is impregnated for comparison with latex A and comparison latex A. The water uptake of the dried paper is determined by Cobb's method (DIN No. 53 132). The amount of water which is taken up by 1 square meter of paper surface over a contact period of 60 seconds under normal conditions amounts of 10.9 g for latex A and to 45.5 g for comparison latex A. Accordingly, latex A gives more waterproof papers than comparison latex A.

3.2 Impregantion of α-cellulose card

A 1.2 mm thick α-cellulose card ot the type used for making shoe inner sole materials, i.e. a card showing high moist-abrasion-resistance, is impregnated for comparison with latices A and B and with comparison latices A and B in such a quantity that the coating has a solids content of about 30%. This is followed by drying for 30 minutes at 110° C.

To determine moist-abrasion-resistance, a round punch 1 cm in diameter wrapped in a gray cotton cloth kept moist is rubbed up and down the finished material 500 times under a load of 2 kg. The α-cellulose cards treated with latices A and B show considerably better abrasion resistance than the cards impregnated with comparison latices A and B.

3.3 Impregnation of needle felts

Needle felts made of pure polypropylene fibres and pure polyamide fibres, which are to be used as lining materials, are impregnated in the same way with latex A and comparison latex A and, after drying at 130° C., are tested for wet-abrasion-resistance. The test is carried out in the same way as described in Example 3.2. The load applied to the punch is 3 kg for 1000 cycles. The needle felts based on polypropylene and polyamide fibres treated with latex A show higher wet abrasion resistance than the same materials treated with comparison latex A.

3.4 Impregnation of synthetic fibre fleeces for the production of base materials for artificial leather Latex C may be thermosensitised by the following procedure:

278 g of latex C are stirred with 1 g of 25% aqueous ammonia solution, 15 g of a reaction product of a long-chain aliphatic amine with 20 moles of ethylene oxide and 40 g of a vulcanisation paste having the following composition to form a homogeneous mixture:
0.2 part by weight of colloidal sulfur;
0.2 part by weight of zinc diethyl dithiocarbamate;
1.5 parts by weight of zinc mercaptobenzthiazole;
5.0 parts by weight of zinc oxide;
5.0 parts by weight of titanium dioxide; and
28.1 parts by weight of a 5% solution of a condensation product of sodium alkyl naphthalene sulfonate with formaldehyde.

The coagulation point of this thermosensitive mixture is 41° C. and does not change over a period of 7 days.

The coagulation point is determined as follows:
10 g of the thermosensitive mixture are wieghed into a 25 ml glass beaker and heated with uniform stirring using a thermometer in a thermostatically controlled water bath at 80° C. until coagulation is complete. The coagulation point is that temperature at which the polymer and the aqueous phase are completely and irreversibly separated.

The described thermosensitised mixture is suitable for consolidating nonwovens of fairly considerable layer thickness of the type which may be used for the production of a base material for artificial leather. Materials having a soft feel and high wet abrasion resistance are obtained.

We claim:

1. In the process for water-proofing a fiber fleece or a needle felt of synthetic fibers which comprises treating the fiber material with a synthetic rubber latex having a particle diameter of less than 200 nm and produced by polymerizing a monomer mixture in the presence of an emulsifier and an initiator with said mixture comprising:

(A) from 0.5 to 6 parts by weight of α,β-monoethylenically unsaturated mono- or dicarboxylic acids and
(B) from 94 to 99.5 parts by weight of a mixture of
(a) from 10 to 90 parts by weight of acyclic conjugated dienes containing from 4 to 9 carbon atoms; and (b) form 10 to 90 parts by weight of aromatic monovinyl compounds having an aromatic nucleus having from 6 to 10 carbon atoms and/or (meth)acrylonitrile with the quantity of (meth)acrylonitrile in the mixture amounting to at most 50 parts by weight;

wherein the improvement comprises said emulsifier is a mononuclear alkylaryl sulfonate having 4 to 18 carbon atoms in the alkyl moiety, said initiator is an oil-soluble organic peroxide, and the polymerization is conducted at 5° to 60° C. in a single step.

2. A process as claimed in claim 1, characterised in that the rubber consists of 1 to 3 parts by weight of component A and 97 to 99 parts by weight of component B.

3. A process as claimed in claim 1, characterised in that, in the rubber, up to 10 parts by weight, based on the monomer total, are replaced by one or more monomers copolymerizable with the monomer components A and B.

4. A process as claimed in claim 1 or 2, characterised in that the rubber consists of methacrylic acid as compnent A and a mixture of butadiene and styrene and/or acrylonitrile as component B.

5. A process as claimed in claim 1, characterised in that the rubber latex is thermosensitized.

6. In the process for water-proofing mineral fibers which comprises treating the fiber material with a synthetic rubber latex having a particle diameter of less than 200 nm and produced by polymerizing a monomer mixture in the presence of an emulsifier and an initiator with said mixture comprising:

(A) from 0.5 to 6 parts by weight of $\alpha,\beta$-monoethylenically unsaturated mono- or dicarboxylic acids and (B) from 94 to 99.5 parts by weight of a mixture of (a) from 10 to 90 parts by weight of acyclic conjugated dienes containing from 4 to 9 carbon atoms; and (b) from 10 to 90 parts by weight of aromatic monovinyl compounds having an aromatic nucleus having from 6 to 10 carbon atoms and/or (meth)acrylonitrile with the quantity of (meth)acrylonitrile in the mixture amounting to at most 50 parts by weight;

wherein the improvement comprises said emulsifier is a mononuclear alkylaryl sulfonate having 4 to 18 carbon atoms in the alkyl moiety, said initiator is an oil-soluble organic peroxide, and the polymerization is conducted at 5° to 60° C. in a single step.

* * * * *